(12) United States Patent
Nochimowski et al.

(10) Patent No.: US 9,098,506 B2
(45) Date of Patent: Aug. 4, 2015

(54) DATA INDEXING BY LOCAL STORAGE DEVICE

(75) Inventors: Alain Nochimowski, Tel Aviv (IL); Micha Rave, Herzliya (IL)

(73) Assignee: SanDisk IL, LTD., Kfar Saba (IL)

( * ) Notice: Subject to any disclaimer, the term of this patent is extended or adjusted under 35 U.S.C. 154(b) by 571 days.

(21) Appl. No.: 12/123,252

(22) Filed: May 19, 2008

(65) Prior Publication Data

US 2009/0171891 A1     Jul. 2, 2009

Related U.S. Application Data

(63) Continuation-in-part of application No. 12/059,107, filed on Mar. 31, 2008.

(60) Provisional application No. 61/018,644, filed on Jan. 2, 2008, provisional application No. 61/018,979, filed on Jan. 4, 2008.

(51) Int. Cl.
*G06F 7/00*     (2006.01)
*G06F 17/30*     (2006.01)

(52) U.S. Cl.
CPC .................................. *G06F 17/3002* (2013.01)

(58) Field of Classification Search
CPC .................................................. G06F 17/3002
USPC ........................... 707/711, 741, 824; 711/103
See application file for complete search history.

(56) References Cited

U.S. PATENT DOCUMENTS

| | | | |
|---|---|---|---|
| 4,887,234 A * | 12/1989 | Iijima | 711/173 |
| 5,509,134 A * | 4/1996 | Fandrich et al. | 711/103 |
| 6,745,286 B2 | 6/2004 | Staub et al. | |
| 6,748,467 B2 | 6/2004 | Yamamoto | |
| 6,934,794 B2 * | 8/2005 | Garritsen et al. | 711/103 |
| 6,986,030 B2 | 1/2006 | Shmueli et al. | |
| 7,085,879 B2 | 8/2006 | Aasheim et al. | |
| 7,143,420 B2 | 11/2006 | Radhakrishnan | |
| 7,209,633 B1 * | 4/2007 | Novak et al. | 386/296 |

(Continued)

FOREIGN PATENT DOCUMENTS

| | | |
|---|---|---|
| GB | 2 400 707 | 10/2004 |
| JP | H11-296418 A | 10/1999 |

(Continued)

OTHER PUBLICATIONS

Mani et al., SenSys '06, Nov. 1-3, 2006, Boulder, Colorado, USA ACM, pp. 425-426.*

(Continued)

*Primary Examiner* — Cheyne D Ly
(74) *Attorney, Agent, or Firm* — Brinks Gilson & Lione (57) ABSTRACT

A computing device including a host device (HD) is in communication with a local storage device (LSD), wherein the LSD includes a memory array. A search index is generated with respect to data stored in the memory array of the LSD. By the LSD without involvement of the HD, the index data is generated with respect to the data stored in the memory array of the LSD. By the LSD, the generated index data is stored on the LSD as at least a part of the search index. The index may include data that can be used to respond to search queries with respect to data of the LSD. The queries may be originated from a HD or from within the LSD. The use of the index is not limited to responding to search queries. For example, the index may be used for content screening.

30 Claims, 5 Drawing Sheets

(56) References Cited

U.S. PATENT DOCUMENTS

| | | | |
|---|---|---|---|
| 7,406,489 | B2 | 7/2008 | Soini et al. |
| 7,747,837 | B2 | 6/2010 | Gorobets et al. |
| 2004/0088417 | A1 | 5/2004 | Bober et al. |
| 2004/0117785 | A1* | 6/2004 | Kincaid .......................... 717/170 |
| 2004/0243793 | A1* | 12/2004 | Tang .................. 713/1 |
| 2005/0160053 | A1 | 7/2005 | Okamoto et al. |
| 2005/0193161 | A1* | 9/2005 | Lee et al. ...................... 711/103 |
| 2005/0203872 | A1 | 9/2005 | Kwong Kwan |
| 2005/0268339 | A1 | 12/2005 | Bobrow |
| 2006/0079284 | A1 | 4/2006 | Lu et al. |
| 2006/0107062 | A1 | 5/2006 | Fauthoux |
| 2006/0107330 | A1 | 5/2006 | Ben-Yaacov et al. |
| 2006/0288166 | A1 | 12/2006 | Smith, Jr. et al. |
| 2007/0033373 | A1 | 2/2007 | Sinclair |
| 2007/0038567 | A1 | 2/2007 | Allaire et al. |
| 2007/0050538 | A1 | 3/2007 | Northcutt et al. |
| 2007/0056042 | A1 | 3/2007 | Qawami et al. |
| 2007/0130370 | A1* | 6/2007 | Akaezuwa ........................ 710/1 |
| 2007/0156998 | A1 | 7/2007 | Gorobets |
| 2007/0186279 | A1 | 8/2007 | Zimmer et al. |
| 2007/0198634 | A1 | 8/2007 | Knowles |
| 2007/0198715 | A1 | 8/2007 | Knowles |
| 2007/0198716 | A1 | 8/2007 | Knowles |
| 2007/0198734 | A1 | 8/2007 | Knowles |
| 2007/0218945 | A1 | 9/2007 | Agami et al. |
| 2008/0027983 | A1 | 1/2008 | Erol et al. |
| 2008/0052781 | A1 | 2/2008 | Bogot et al. |
| 2008/0096559 | A1 | 4/2008 | Phillips et al. |
| 2008/0126680 | A1 | 5/2008 | Lee et al. |
| 2008/0147962 | A1 | 6/2008 | Diggs et al. |
| 2008/0147964 | A1* | 6/2008 | Chow et al. ................... 711/103 |
| 2008/0270725 | A1 | 10/2008 | Roden et al. |
| 2008/0301396 | A1 | 12/2008 | Hamada et al. |
| 2009/0043984 | A1 | 2/2009 | Chang et al. |
| 2009/0094160 | A1 | 4/2009 | Webster et al. |
| 2009/0171911 | A1 | 7/2009 | Nochimowski et al. |
| 2009/0172050 | A1 | 7/2009 | Nochimowski et al. |
| 2009/0172217 | A1 | 7/2009 | Nochimowski et al. |
| 2009/0172274 | A1 | 7/2009 | Nochimowski et al. |
| 2009/0172275 | A1 | 7/2009 | Nochimowski et al. |
| 2009/0172276 | A1 | 7/2009 | Nochimowski et al. |
| 2009/0172400 | A1 | 7/2009 | Rave et al. |
| 2009/0172694 | A1 | 7/2009 | Nochimowski et al. |

FOREIGN PATENT DOCUMENTS

| | | |
|---|---|---|
| JP | 2002-163577 A | 6/2002 |
| JP | 2003-058487 A | 2/2003 |
| JP | 2005-056077 A | 3/2005 |
| JP | 2005-522098 A | 7/2005 |
| WO | WO 01/88780 | 11/2001 |
| WO | WO 2005/125072 | 12/2005 |
| WO | WO 2006/014791 | 2/2006 |
| WO | WO 2007/019258 | 2/2007 |
| WO | WO 2007/044947 | 4/2007 |
| WO | WO 2007/138584 | 12/2007 |

OTHER PUBLICATIONS

Zeinalipour-Yazti et al., MicroHash: An Efficient Index Structure for Flash-Based Sensor Devices, FAST 05, pp. 1-14.*
Anciaux et al., "A Tamper-Resistant and Portable Healthcare Folder," International Journal of Telemedicine and Applications, vol. 2008, 9 pgs., 2008.
Office Action dated Dec. 27, 2010 in U.S. Appl. No. 12/029,356.
Sim Application Toolkit (SAT) [online], May 19, 2007 [retrieved on Dec. 13, 2010] from URL: http://www.sanjayahuja.com/tutorials/SimApplicationToolkit.html.
Office Action dated Dec. 7, 2010 in U.S. Appl. No. 12/101,065.
Search Report dated Sep. 10, 2010 in EP Application No. 10 007 973.0.
Office Action dated Oct. 6, 2010 in U.S. Appl. No. 12/059,107.
Office Action dated Oct. 5, 2010 in U.S. Appl. No. 12/123,304.
International Search Report dated Aug. 7, 2009 in PCT Application No. PCT/US2008/087695.
Written Opinion dated Aug. 7, 2009 in PCT Application No. PCT/US2008/087695.
Potter et al., "WebPod: Persistent Web Browsing Sessions with Pocketable Storage Devices," Proceedings of the 14$^{th}$ International Conference on the World Wide Web, [Online] May 14, 2005, pp. 603-612.
Lahti et al., "A Mobile Phone-based Context-aware Video Management Application," Proceedings of SPIE—The International Society for Optical Engineering 2006 SPIE, vol. 6074.
Ravi et al., "Securing Pocket Hard Drives," IEEE Pervasive Computing, IEEE Service Center, Los Alamitos, CA, vol. 6, No. 4, Oct. 1, 2007, pp. 18-23.
Office Action for U.S. Appl. No. 12/059,107, dated Apr. 4, 2011, 9 pages.
Office Action for U.S. Appl. No. 12/029,356, dated Mar. 25, 2011, 40 pages.
Office Action for U.S. Appl. No. 12/019,573, dated Mar. 1, 2011, 33 pages.
Office Action for U.S. Appl. No. 12/123,304, dated Mar. 11, 2011, 12 pages.
Office Action for U.S. Appl. No. 12/101,065, dated Feb. 25, 2011, 8 pages.
Office Action for U.S. Appl. No. 12/177,006, dated Nov. 24, 2010, 11 pages.
Office Action for U.S. Appl. No. 12/177,006, dated Mar. 15, 2011, 8 pages.
Hennessy et al., *Computer Organization and Design*, Morgan Kaufmann Publishers, Inc., second edition, pp. 675-678.
Zeinalipour-Yazti et al., "MicroHash: An Efficient Index Structure for Flash-Based Sensor Devices," FAST 05, pp. 1-14.
Office Action for U.S. Appl. No. 12/019,573, dated Dec. 8, 2011, 27 pages.
Office Action for U.S. Appl. No. 12/045,472, dated May 9, 2011, 12 pages.
Notice of Allowance for U.S. Appl. No. 12/045,472, dated Oct. 27, 2011, 5 pages.
Office Action for U.S. Appl. No. 12/059,107, dated Jan. 3, 2012, 7 pages.
Office Action for U.S. Appl. No. 12/177,006, dated Dec. 6, 2011, 10 pages.
Examiner's Report for European Patent Application Serial No. 08 870 111.5, dated Jan. 20, 2011, 6 pages.
European Search Report for European Patent Application Serial No. 10 007 974.8, dated Jan. 20, 2011, 6 pages.
Office Action for U.S. Appl. No. 12/101,065, dated Feb. 9, 2012, 9 pages.
Office Action for U.S. Appl. No. 12/036,440, dated Mar. 5, 2012, 27 pages.
Ex Parte Quayle Action for U.S. Appl. No. 12/019,573, dated Jul. 17, 2012, 5 pages.
Notice of Allowance for U.S. Appl. No. 12/036,440, dated Jun. 22, 2012, 14 pages.
Office Action for U.S. Appl. No. 12/101,065, dated Jun. 19, 2012, 10 pages.
Notice of Allowance for U.S. Appl. No. 12/177,006, dated May 30, 2012, 10 pages.
Office Action for U.S. Appl. No. 13/355,146, dated Jul. 16, 2012, 17 pages.
Kubiatowicz et al., "OceanStore: An Architecture for Global-Scale Persistent Storage", A.C.M., 2000, pp. 190-201.
Notice of Allowance for U.S. Appl. No. 12/019,573, dated Oct. 10, 2012, 8 pages.
Notice of Allowance for U.S. Appl. No. 12/036,440, dated Sep. 26, 2012, 19 pages.
Notice of Allowance for U.S. Appl. No. 12/045,472, dated Sep. 13, 2012, 5 pages.
Notice of Allowance for U.S. Appl. No. 12/177,006, dated Oct. 4, 2012, 9 pages.
Office Action for U.S. Appl. No. 13/355,146, dated Nov. 28, 2012, 17 pages.
Office Action for Chinese Patent Application Serial No. 201010506295.1, dated Nov. 5, 2012, 14 pages.

(56) References Cited

OTHER PUBLICATIONS

Office Action for Japanese Patent Application Serial No. 2010-541483, dated Dec. 4, 2012, 11 pages.
Baird et al., "Distributed Information Storage Architecture," Twelfth IEEE Symposium on Mass Storage Systems, 1993, pp. 1051-9173.
Melazzi et al., "The Simplicity Project: easing the burden of using complex and heterogeneous ICT devices and services," URL: http://www.ist-simplicity.org/_publications/Mobile%20Summit%202004%20-%20Paper%20State%20of%20Art.pdf, 8 pages.
Wang, Jinghua, "VHE Smart Card Manager," URL: http://jerry.c-lab.de/vhelab/r_smartcard.html, Feb. 7, 2003.
U.S. Appl. No. 11/967,938, filed Dec. 31, 2007.
U.S. Appl. No. 11/964,060, filed Dec. 26, 2007.
www.allinyourpocket.com, "All your files in your pocket!" downloaded Apr. 15, 2008.

* cited by examiner

DATA INDEXING BY LOCAL STORAGE DEVICE

CROSS REFERENCE TO RELATED APPLICATIONS

This patent application claims the benefit of priority under 35 U.S.C. 119(e) to U.S. Provisional Patent Application No. 61/018,644 filed on Jan. 2, 2008 entitled "DISTRIBUTED STORAGE SERVICE SYSTEMS AND ARCHITECTURE" by Nochimowski et al.; U.S. Provisional Patent Application No. 61/018,979 filed on Jan. 4, 2008 entitled "DISTRIBUTED STORAGE SERVICE SYSTEMS AND ARCHITECTURE" by Nochimowski et al., both of which are incorporated by reference herein in their entirety; and this application is a CIP of U.S. patent application Ser. No. 12/059,107 filed on Mar. 31, 2008 entitled "DATA USAGE PROFILING BY LOCAL STORAGE DEVICE" by Nochimowski et al, which is incorporated by reference herein in its entirety for all purposes. This patent application is related to co-pending U.S. patent application Ser. Nos. i) Ser. No. 12/029,356 entitled "STORAGE DEVICE HAVING DIRECT USER ACCESS" by Nochimowski et al., filed Feb. 11, 2008; ii) Ser. No. 12/019,573 entitled "DISTRIBUTED STORAGE SERVICE SYSTEMS AND ARCHITECTURE," by Nochimowski et al., filed Jan. 24, 2008; iii) Ser. No. 12/036,440 entitled "CACHE MANAGEMENT" by Nochimowski et al., filed Feb. 25, 2008; iv) Ser. No. 12/045,472 entitled "DIGITAL CONTENT DISTRIBUTION AND CONSUMPTION," by Rave et al., filed Mar. 10, 2008; v) Ser. No. 12/101,065 entitled "STORAGE DEVICE HAVING REMOTE STORAGE ACCESS", by Nochimowski et al., filed Apr. 10, 2008; vi) Ser. No. 12/123,304 entitled "DATA INDEXING BY LOCAL STORAGE DEVICE," by Nochimowski et al., filed May 19, 2008; and vii) Ser. No. 11/967,938 entitled LOCAL PROXY SYSTEM AND METHOD by Mosek et al., filed Dec. 31, 2007 all of which are incorporated by reference in their entirety for all purposes.

TECHNICAL FIELD

The present invention relates to a local storage device having a memory array and managed as data blocks. More particularly, the present invention relates to a local storage device that includes capability to index data in the local storage device without involvement of a host device to which the local storage device is operatively coupled.

BACKGROUND

Mass storage devices (such as FLASH memory devices that includes SD and MMC type mass storage devices) have increased greatly in both storage capacity and in the capabilities (i.e., processing resources) of associated mass storage device controllers. This increase in available storage capacity has had a synergistic effect on the general availability of devices ("host devices") whose capabilities can depend greatly on available memory. Such devices include portable digital devices such as portable media players, interactive personal communication devices (cell phones, PDAs, etc.) and the like. In this way, a digital consumer's exposure to digital products that use the storage capability of mass storage devices such as FLASH memory has greatly increased.

This exposure typically spans across multiple host devices—connected or unconnected—or access modes—wired vs. wireless, fixed vs. mobile etc.—each having specific storage requirements. A proposed configuration to generate an index of the data stored on a mass storage device includes, generally, having a different host-specific program being used for each host device. That program is typically installed on the host device and/or on a remote server to which the host device is always or occasionally connected.

The proposed indexing configuration, then, generally includes a program that is tightly coupled to the host device. Thus, for example, such an indexing program that is tightly coupled to a host device generally must be customized to operate with that host device. Yet further, having the host device highly involved in data indexing can take processing power from the host device that may be desired or required for other functions.

Another possible drawback of the legacy indexing configuration is evidenced as "content side-load," where a mobile host device is connected to a computer via a USB cable, for example, and content is stored in the storage device. In this case, the file system of the computer to which the mobile host is connected is the one managing the device, which results in the mobile indexing application not being aware of the storage operation carried out by the computer and, therefore, not indexing the content.

Therefore, an indexing method, system, and apparatus that addresses these shortcomings is desirable.

SUMMARY

In accordance with one aspect, a computing device having a host device (HD) is in communication with a local storage device (LSD), wherein the LSD includes a memory array. A method operates to generate a search index with respect to data stored in the memory array of the LSD. By the LSD without involvement of the HD, the index data is generated with respect to the data stored in the memory array of the LSD. By the LSD, the generated index data is stored on the LSD as at least a part of the search index. The index may include data that can be used to respond to search queries with respect to data of the LSD. The queries may be originated from a HD or from within the LSD. The use of the index is not limited to responding to search queries. For example, the index may be used for content screening.

DETAILED DESCRIPTION

The inventors have realized the desirability of providing functionality in a local storage device (LSD) to index data in a memory array of the LSD without involvement of a host device (HD). Thus, for example, the data of the LSD may be indexed even when the LSD is being used by multiple HD's. Furthermore, the monitoring and characterizing functionality need not be ported to various HD platforms, since the functionality is independent of HD platform. The indexing may include generating a collection of data that can be used to respond to search queries with respect to data of the LSD. The queries may be originated from a HD or from within the LSD.

The use of the indexing result is not limited to responding to search queries. For example, the indexing result may be used for content screening, i.e., an application looking for particular strings like "porn," so as to forbid access to unauthorized content in the memory array of the LSD. The content screening may be carried out, for example, in the HD (resulting, for example, in avoiding access requests to particular content in the memory array of the LSD or, as another example, may be carried out in the LSD itself, blocking access requests, whether write access requests or read access requests, that are received from the HD.

Reference will now be made in detail to particular embodiments of the invention an example of which is illustrated in the accompanying drawings. While the invention will be described in conjunction with the particular embodiments, it will be understood that it is not intended to limit the invention to the described embodiment. To the contrary, it is intended to cover alternatives, modifications, and equivalents as may be included within the spirit and scope of the invention as defined by the appended claims.

With the increase of the capabilities of storage device controllers, the execution of software applications from within the storage device using processing resources made available by the storage device controllers becomes possible. This enhanced operability of the storage device controllers leads to a paradigm of new indexing modes which are, for example, useful to index data on the storage device without involvement of the host device. Such indexing can be used, for example, for improving a user's digital content consumption experience that typically spans across multiple devices— connected or unconnected—or access modes—wired vs. wireless, fixed vs. mobile etc.

The index may be, for example, exposed to, provided to or accessible by a service provider that in return provides the user with enhanced search or other usage capability. For example, the storage device may contain pre-loaded content and the user may also be encouraged to download content (such as from a web site associated with the retailer). In return the user may provide consent for an index to be provided from the storage device and, for example, possibly even receive focused proposals from the retailer and/or associated entities. As another example, storage device vendors may be enabled to provide targeted services to their customer base.

In order to provide support to a "user-centric" (as opposed to traditional "device-centric") indexing approach, the invention goes beyond the strict limitations of the host managed, LBA-based ("LBA is an abbreviation for logical block addressing) mass storage paradigm and provides an indexing paradigm that may be fully backward compatible with legacy mass storage devices but also enhances the indexing of mass storage, thus enhancing the retrieval/search of digital content usage. In addition, the reporting of an index generated in this way need not depend on indexing functionality in a host device.

The invention can further pertain to an electronic system that includes a memory device discussed above. Memory devices (e.g., memory cards) are commonly used to store digital data for use with various electronics products. The memory device is often removable from the electronic system so the stored digital data is portable. The memory devices according to the invention can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices), and medical monitors.

Embodiments of the invention are discussed below with reference to FIGS. 1 to 5. However, those skilled in the art will readily appreciate that the detailed description given herein with respect to these figures is for explanatory purposes as the invention extends beyond these limited embodiments. It should be noted that it is contemplated that the invention can be used for any type of local data storage devices that can include non-volatile memory such as Multi Media Card (MMC) and Secure Digital Card (SD).

Figure 1:
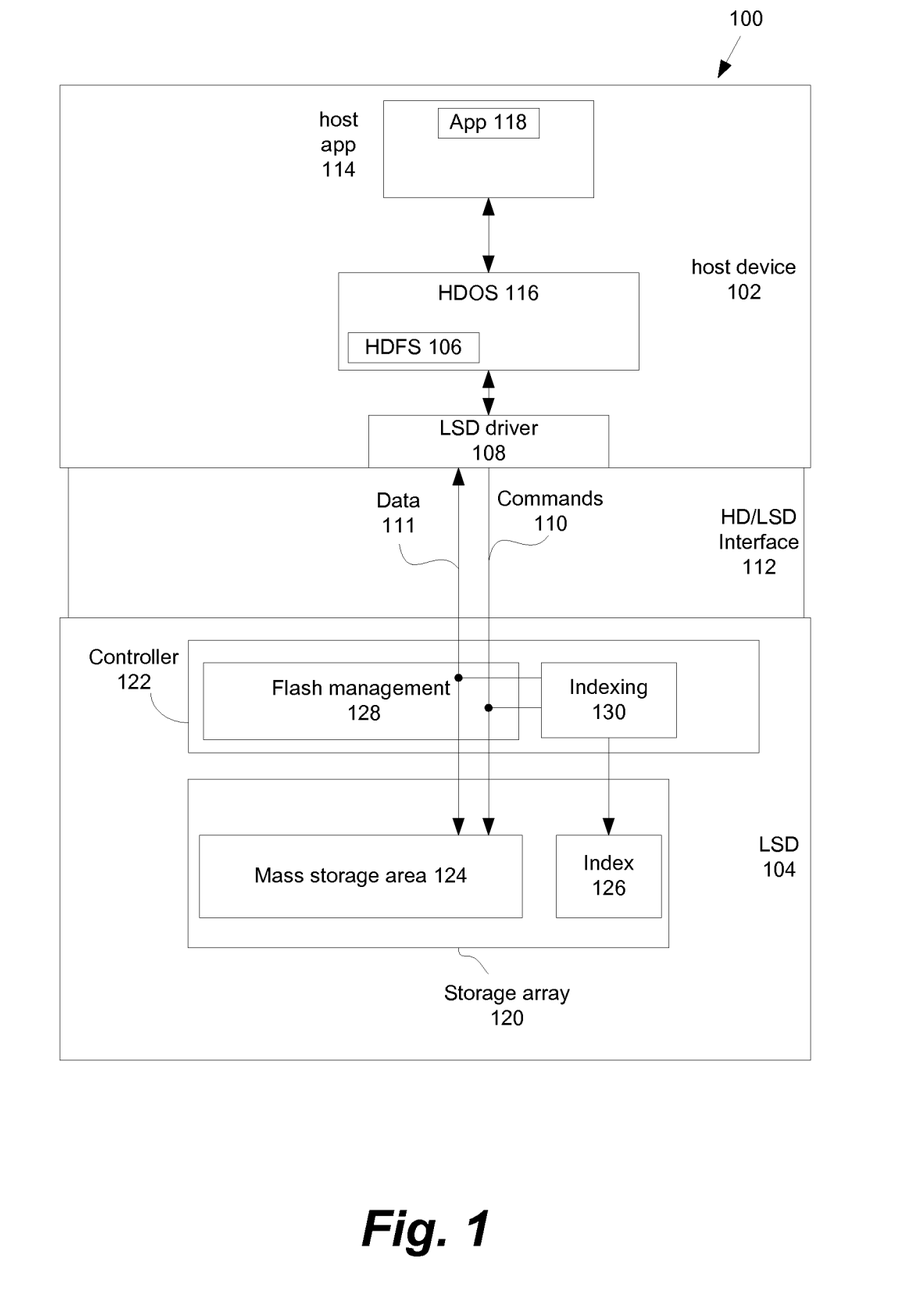
FIG. 1 illustrates a computing system including a host device (HD) and a local storage device, wherein the LSD is configured to index data stored in a memory array of the LSD.

FIG. 1 illustrates a computing system 100 including a host device (HD) 102 and a local storage device (LSD) 104. HD 102 includes a host device file system (HDFS) 106. LSD 104 can take the form of removable memory devices such as a memory card having a relatively small form factor and can be used to store digital data for electronics products such as cameras, hand-held or notebook computers, network cards, network appliances, set-top boxes, hand-held or other small audio players/recorders (e.g., MP3 devices), and medical monitors. Examples of a memory card include PC Card (formerly PCMCIA device), Flash card (e.g., Compact Flash Type I and II), Secure Digital (SD) card, Multimedia card (MMC), ATA card (e.g., Compact Flash card), memory stick, SmartMedia card. In addition, LSD 104 can take the form of non-removable memory devices such as SD compatible iNAND™ embedded Flash drive manufactured by SanDisk Corporation of Milpitas Calif.

LSD 104 can communicate with HD 102 by way of HD/LSD interface 112. It should be noted that HD/LSD 112 can be configured as a mechanical entity (such as a socket or interconnecting bus) into which HD 102 and LSD 104 can mechanically connect. In some embodiments, HD/LSD interface 108 can take the form of a wireless interface. Generally, HD 102 includes a processor. However, for the sake of clarity, the processor included in HD 102 is neither shown nor mentioned further in this discussion but is, nonetheless, presumed to be present. LSD 104 can be physically connected exclusively to HD 102 and therefore does not access or otherwise communicate with circuits and/or applications external to computing system 100 without intervention by HD 102. Typically, LSD 104 does not utilize any interface to a device external to HD 102 other than that interface provided by the HD 102 though, in some cases, LSD 104 may directly interface to a device external to HD 102.

HD 102 includes host device file system (HDFS) 106 in communication with LSD driver 108. In the described embodiment, HDFS 106 can issue LSD management command 110 to LSD driver 108. LSD driver 108 can, in turn, pass LSD management command 110 (appropriately formatted) to LSD 104 by way of HD/LSD interface 112. For example, LSD management command 110 can take the form of a block command in those cases where LSD 104 is configured to include a data storage array having logical block address (LBA) architecture. LSD management commands 110 result in the flow of data 111 between LSD 104 and HD 102.

HD 102 can also include (internal) software application 114. By internal application it is meant that software application 114 can utilize HDFS 106 (which is typically part of the host device operating system 116) and LSD driver 108 to communicate with LSD 104. Such software applications can include an application 118 each of which typically resides in host device main memory (that can take the form of a hard disk drive, or HDD, as well as non-volatile memory such as FLASH memory).

For example, computing system 100 can be a portable media player, and application 118 may be a media player application. In this case, for example, LSD 104 may store various digital media files such as audio files in the form of MP3, video/audio files in the form of MP4 or still photograph files in the form of JPEG. The LSD management commands 110 may be, for example, data access commands to retrieve the data of the files from LSD 104.

In the FIG. 1 example, the data access commands may be HDFS commands to read a portion of a file allocation table (FAT) stored in a mass storage area 120 of the LSD 104 and to then read one or more data blocks from the mass storage area 120. For example, the mass storage area 120 may be a memory array and the mass storage area may be managed by the HDFS 106 and not by a file system local to the LSD 104. For example, LSD 104 can include controller 122 and mass storage array 120 having a first storage area 124 and second storage area 126. It should be noted that storage array 120 can be formed of an array of memory cells (such as FLASH). In this particular case, even though mass storage array 120 can be presumed to be an array of FLASH memory cells, the invention is not limited to only FLASH type memory cells since it is contemplated that the invention can be used with any appropriate type of memory cell.

Controller 122 includes flash manager 128 that can manage first storage area 124, acting at the behest of HDFS 106. In a particularly useful arrangement, first storage area 124 can be an LBA-based mass storage array. Accordingly, the location of blocks of data stored in first storage area 124 can be specified using logical block addressing (LBA) where each block can be, for example, on the order of 512 or 1024 bytes each. In this way, first storage area 124 can be fully backward compatible with any contemplated legacy mass storage architectures (i.e. able to work in conjunction with legacy hosts) and more specifically LBA type systems. In particular, LSD 104 (in particular, first storage area 124) can operate under standard LBA architecture using legacy interfaces, busses, and all associated protocols providing for full compatibility with an installed base of legacy products.

Controller 122 further includes an indexer 130 that is configured to index data stored in the first storage area 124 of the LSD 104 without involvement of the host device 102. In one example, the indexer 130 indexes data as the data is being stored to and/or read from the first storage area 124 by the HD 102. Thus, for example, the indexer 130 may discern the data content being transferred between the first storage area 124 and the HD 102 and, based thereon, index the data in the first storage area 124. The monitoring and indexing is done by the LSD 104 and the result is stored as "index data" in the second storage area 126 of the mass storage array 120. As another example, the indexer 130 may generate index data based on commands being used by the host device 102 to access the first storage area 124. As yet another example, the indexer 130 may, without the involvement of the host device 102, access data in the first storage area 124 to generate index data regarding the data in the first storage area 124.

Figure 2:
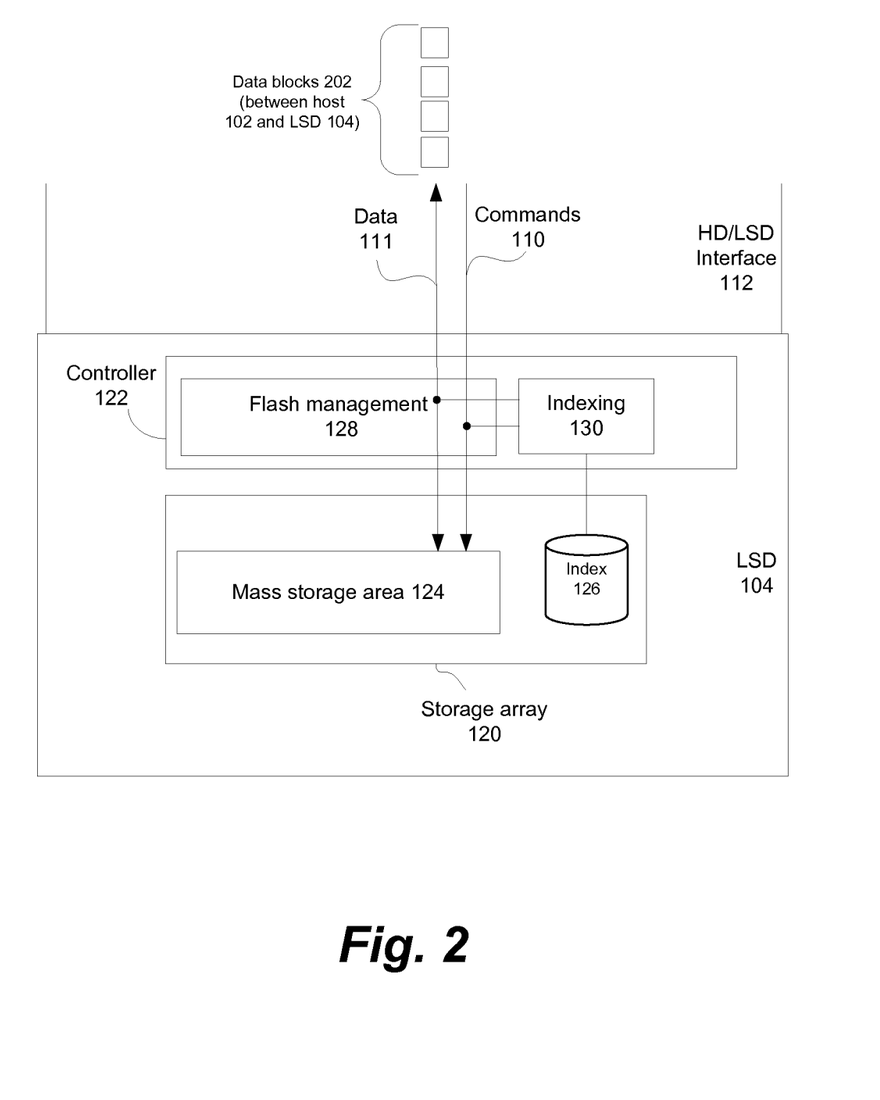
FIG. 2 illustrates an example in which the index data is generated based on data access to the LSD by the HD.

FIG. 2 illustrates an example of how the data indexing may occur in greater detail based on observing data access operations by the HD 102 to the LSD 104, the observing being without involvement of the HD 102. Referring to FIG. 2, commands 110 are provided from the HD 102 to the LSD 104 via the HD/LSD interface 112. As discussed above, the commands 110 are provided to the flash manager 128 of the controller 122 to manage first storage area 124 acting at the behest of HDFS 106. The indexer 130 observes the commands 110 and, based thereon, in conjunction with data 111 observed to be stored to or read from the first storage area 124, indexes the data in the first storage area 124. The commands 110 may be used to characterize the data access to inform the indexing functionality. The index information is provided to be stored in the second storage area 126 of the storage array 120.

While the commands 110 are illustrated as being provided to the flash manager 128 of the controller acting at the behest of HDFS 106, in other examples, commands or other signals are provided from the HD 102 to the LSD 104 that are not as a result of HDFS operations. For example, such command or other signals may be provided based on other operations, such as driver level operations that are not as a result of HDFS operations.

The data access characterization may help to distinguish, for example, between the data that is indexed being video, music or photo, which can inform the indexing functionality. Thus, index information provided to be stored in the second storage area 126 of the storage array 120 may be based at least in part on the data access characterization by the indexer 130, whether directly being the determined data access characterization or a result of further processing the determined data access characterization.

For example, if it is discerned by the indexer 130 that the HD 102 provides as a command 110 a single data read command that is a read data block command, and there are no further corresponding data read commands, then it may determine that a photo read, by the HD 102, has occurred from the first storage area 124. As another example, if it is discerned that the HD 102 provides a command 110 to read the File Allocation Table (FAT) of the first storage area 124 (presumably to map the data location), and then it is discerned that the HD 102 provides commands 110 to read data blocks from the first storage area 124 at a fixed rate/throughput, then the indexer 130 can discern that this group of commands corresponds to a read of a music file from the first storage area 124. As yet another example, if it is discerned by the indexer 130 that the HD 102 provides a command 110 to read the File Allocation Table (FAT) of the first storage area 124 (presumably to map the data location), and then the indexer 130 discerns that the HD 102 provides commands 110 to read data blocks from the first storage area 124 at a variable rate/throughput, then this group of commands can be characterized as a read of a video file from the first storage area 124. (In some cases, though, the FAT data may be cached in the HD, so it may be difficult or impossible to correlate subsequent data access commands to the FAT read.) These are examples of what the indexer 130 can discern from the commands 110 from the HD 102 to the LSD 104 and other examples are possible. While many of the examples herein are relative to read data access, the data access being characterized may also (or instead) include write data access, such as write data access to load media files into the first storage area 124.

While these are examples of data access patterns, it should be understood that the patterns can be pre-loaded in the LSD 104 (possibly even dynamically updated, examples of which are discussed later in this patent application) and used as a reference to identify specific types of data access by the indexer 130. In use, the patterns may be quite simple, as in the examples, or may be much more complex.

Furthermore, the indexer 130 may use the content of data blocks 202 being transferred between the HD 102 and the first storage area 124 of the LSD 104 (e.g., in either or both of a read and write direction) in the process of providing index information of the data stored in the memory array 124. For example, the indexer 130 may discern the content of a data block includes the string "JFIF," may characterize the data block as corresponding to a photo (JPEG) and may use this characterization in the process of providing index information. As another example, an MP3 file typically has "tags" starting with the string "ID3", PDF files starts with "%PDF", and mp4 video files include the string "ftyp3gp." Thus, for example, each "tag" may be considered as one specific pattern type, which can be manipulated like any other pattern, such as being pre-loaded, updated, or otherwise.

The data characterizations may be, for example, stored in the index as part of the index data. Thus, for example, the data characterizations may be used to determine search result and/or to further refine search results that would otherwise be provided based on a word or data index alone.

Furthermore, the indexer 130 may directly employ the content of data blocks 202 being transferred between the HD 102 and the first storage area 124 of the LSD 104 (e.g., in either or both of a read and write direction) as index data of the data stored in the first portion of the memory array 124. Such content may include, for example, textual data or metadata directly included in the content of the data blocks 202.

In some examples, the content to be indexed may be further processed to recognize data indirectly represented thereby. Thus, for example, if it is determined by the indexer 130 that the data has been characterized as an audio file, then digital voice recognition may be used to recognize content data (e.g., such as spoken or sung words) to be indexed. Similarly, image processing may be used to recognize the content if it is determined by the indexer 130 that the data has been characterized as a video file. Thus, for example, it may be possible to recognize the general subject matter or even specific details of the video file that can then be stored as part of the search index.

In some examples, the index may also or instead have characteristics of a catalog such that that index can be used for responding to search queries that are not just based on content desired to be present in the search results but, rather, may also or otherwise be based on behavior (or other metadata, not strictly content-based, with respect to particular documents (such as media) stored in the memory array of the LSD. For example, the indexing may be applied to the management of media by one or more programs executing in the HD and accessing the media using LBA-based commands, and it may be desirable to base a search on information in a catalog such as:

How many times has a song stored in the memory array of the LSD has been played?
When was a song stored in the memory array of the LSD played last?
Was a song stored in the memory array of the LSD played to the end, or was the playing aborted?

For example, when a media item is being played, the indexer 130 may operate to update some fields in the catalog for the item, such as "date last played" or "number of times played."

Furthermore, for example, the catalog may be updated based on discerning, from commands 110 and/or data 111, operations such as:

defining a new play list—a new record is added to the play list catalog; and
deleting an item—a record is deleted from the catalog.

The searching of the catalog may be done as a query such as "search?artist=madonna&number_times_played=0"—means "find all songs by Madonna that I never played." The searching may also or otherwise be based on content in the songs, such as "London" or "guitar solo" or other content that has been discerned and indexed by the indexer 130.

In addition to monitoring the commands 110 and data 111 passed between the host device 102 and the LSD 104, the indexer 130 may operate by directly accessing the data in the mass storage area 124. Thus, for example, in this way, the indexer may operate, such as in the background, to generate index data for storage in the index 126, still without involvement of the host device 102 to populate the index 126.

The second storage area 126 may include the index generated by the indexer 130. For example, in FIG. 2, the second storage area 126 may include any of various types of index data now known or in the future known to be usable by a search engine to return search results, relevant to a corpus of data, in response to one or more search queries.

The index may be stored in the storage array 120, possibly even invisible to the HDFS 106. Having described some examples of how index data may be generated by the LSD 104, we now discuss some examples of how the index data may be used. In general, the index data may be used by the LSD 104 itself, by the HD 102 and/or by an external process.

Referring again to FIG. 1, the system 100 may be configured such that the search index 126 may be obtained and/or used by the HD 102. For example, the search index 126 may be stored within the mass storage area 124 of the storage array 120. See, for example, U.S. patent application Ser. No. 12/029,356, referenced above in the "Related Applications" section, which describes an example of a method to write into the mass storage area of an LSD even though this area is managed by an external file system (HDFS). In this case, the search index 126 is accessible to the HD 102 using operations that may otherwise be used to generally access data in the mass storage area 124. Thus, for example, an application 118 executing on the HD 102 may operate such that the HDFS 106 causes commands 110 to be provided to LSD 104 via LSD driver 108 and HD/LSD interface 112. Such commands 110 may be provided to flash manager 128 to cause the search index 126 to be provided to HD 102 as data 111 via HD/LSD interface 112.

The search index thus obtained by HD 102 may be used, for example, by an application 118 being executed by the HD 102. The search index thus obtained may be provided from the HD to an external device or system, such as to a media management system on a computer or other server to which HD 102 may be connected. Such search index may be used by that external device or system, for example, in at least partial determination of how that external device or system interacts with HD 102 or otherwise operates.

Figure 3:
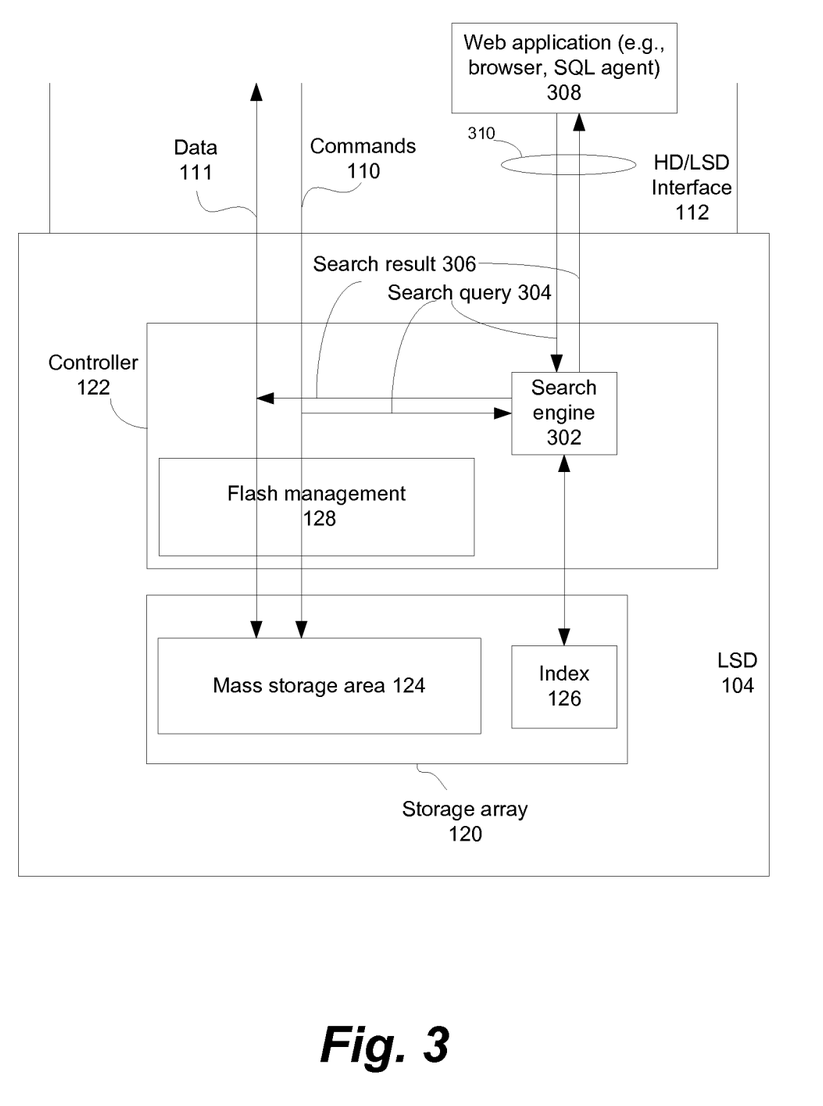
FIG. 3 shows an example configuration of a system in which the indexing data may be obtained and/or used by the HD.

Referring now to FIG. 3, this shows an example configuration of a system in which the index may be used by a search engine 302 executed by the LSD 104 itself. In the example, the flash manager 128 may operate to receive a command 110 or part of a command 110 from the host device 102 that is a search query 304. The search engine 302 may access the search index 126 and, based on the search query 304, return a search result 306 to the host device 102. As another example, an indexing result may be used for content screening by the LSD, i.e., an application looking for particular strings like "porn," so as to forbid access to unauthorized content in the memory array of the LSD. The content screening may be carried out, for example, in the HD (resulting, for example, in avoiding access requests to particular content in the memory array of the LSD or, as another example, may be carried out in the LSD itself, blocking access requests, whether write access requests or read access requests, that are received from the HD.

As another example, an application 308 (e.g., a web application, such as a browser or SQL agent) may be operating on the host device 102 and may interact with the search engine 302 (such as through a logical interface 310 other than the logical interface used for data access operations) to obtain a search result 306 in response to a search query 304.

Figure 4:
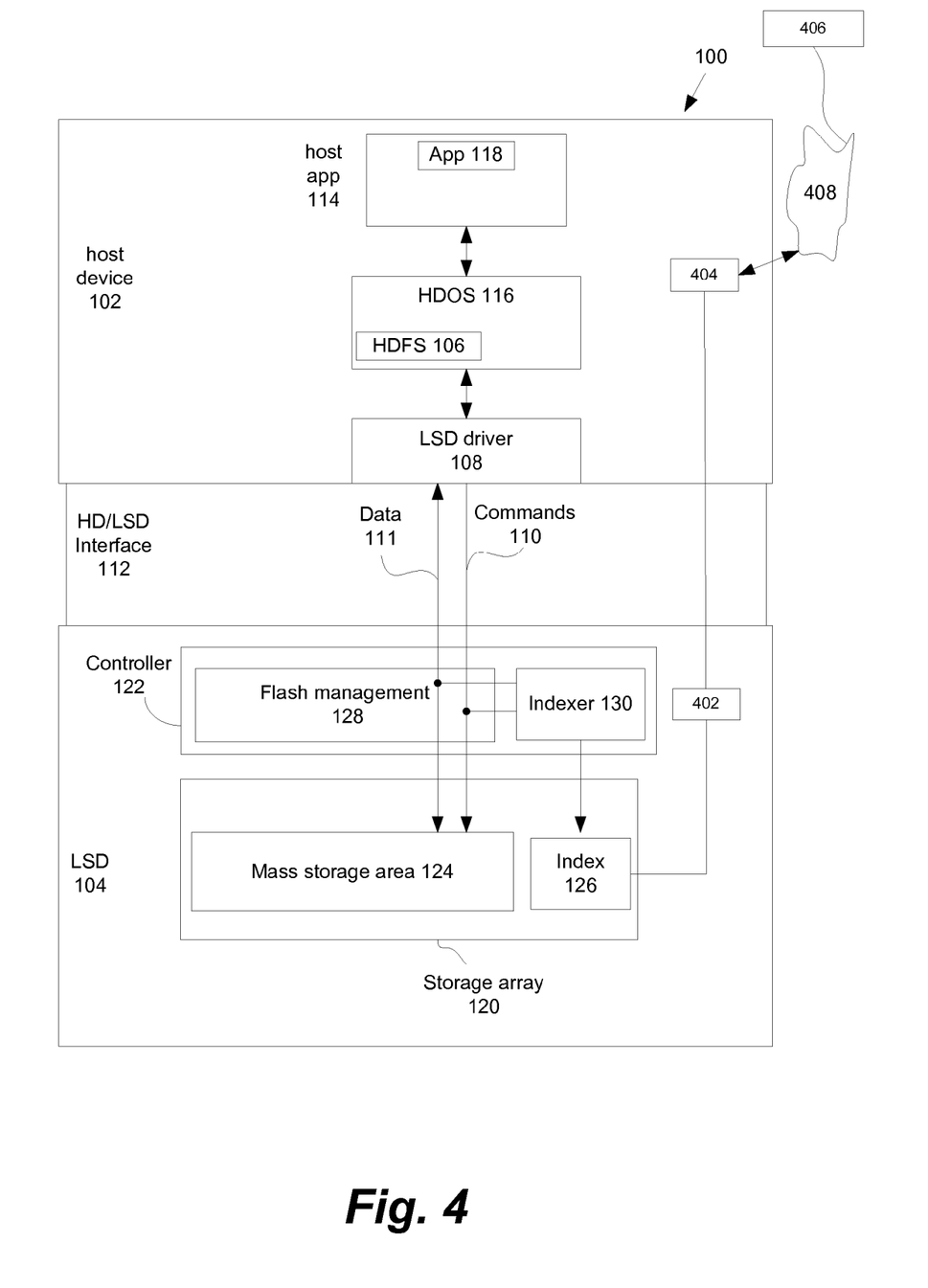
FIG. 4 illustrates an example configuration in which the indexing data may be transferred to an external device outside of a master/slave paradigm.

FIG. 4 illustrates an example configuration in which some or all of the search index 126 may be transferred to or be accessible to an external device (such as device 406 coupled to HD 102 via a network 408) outside of a master/slave paradigm such as implemented, for example, by the host application 114, HDFS 106 and LSD driver 108 in cooperation with processing of LSD 104. An example of data transfer or data access outside a conventional master/slave (or host/slave) paradigm is described, for example, in U.S. patent application Ser. No. 12/029,356, referenced above in the "Related Applications" paragraph.

Referring still to FIG. 4, an agent 402 on LSD 104 is in communication with an agent 404 on HD 102. Thus, for example, communication between agent 402 on LSD 104 and agent 404 on HD 102 may be via a secure path that does not require intervention by HDFS 106 and/or such that the transferred index data is not otherwise accessible to processing (such as host application 114) on HD 102.

Furthermore, device 406 may also perform storage operations (as mentioned above) regarding the search index 126, such as to clear the search index 126 or portions of the search index, modifying information used to determine the search index (e.g., such as parameters used to perform the voice recognition or image recognition processing), or other such information.

Furthermore, using the secure path, the index 126 may be accessed by device 406, such as for the purpose of responding to a search query, without transferring the search index 126 to the device 406. In one example, the agent 402 may include search engine functionality that can provide a query response to the external device 406, by processing the search index 126 on the LSD 104, based on a search query provided to the agent 402 from the external device 406. As discussed above, the search query may be to search for particular content and/or to utilize metadata in the index 126 to determine a query response.

In general, using the FIG. 4 configuration as an example, an application that processes the search index 126 may be accessed via a logical interface shared with any relevant application in the HD (or in the LSD). The fact that the LSD exposes an internet/IP/network interface makes it easier for a standard internet client application in the HD to access the index in the LSD as a standard server. Thus, there may be a standard Internet/IP-based client application (e.g. web browser or SQL client) running on the HD and the index 126 may be accessed as a server (e.g., Web Server or SQL server) in the LSD. In any case, the server is in the LSD, not in the HD, and the client is either in the HD or in a remote device.

Figure 5:
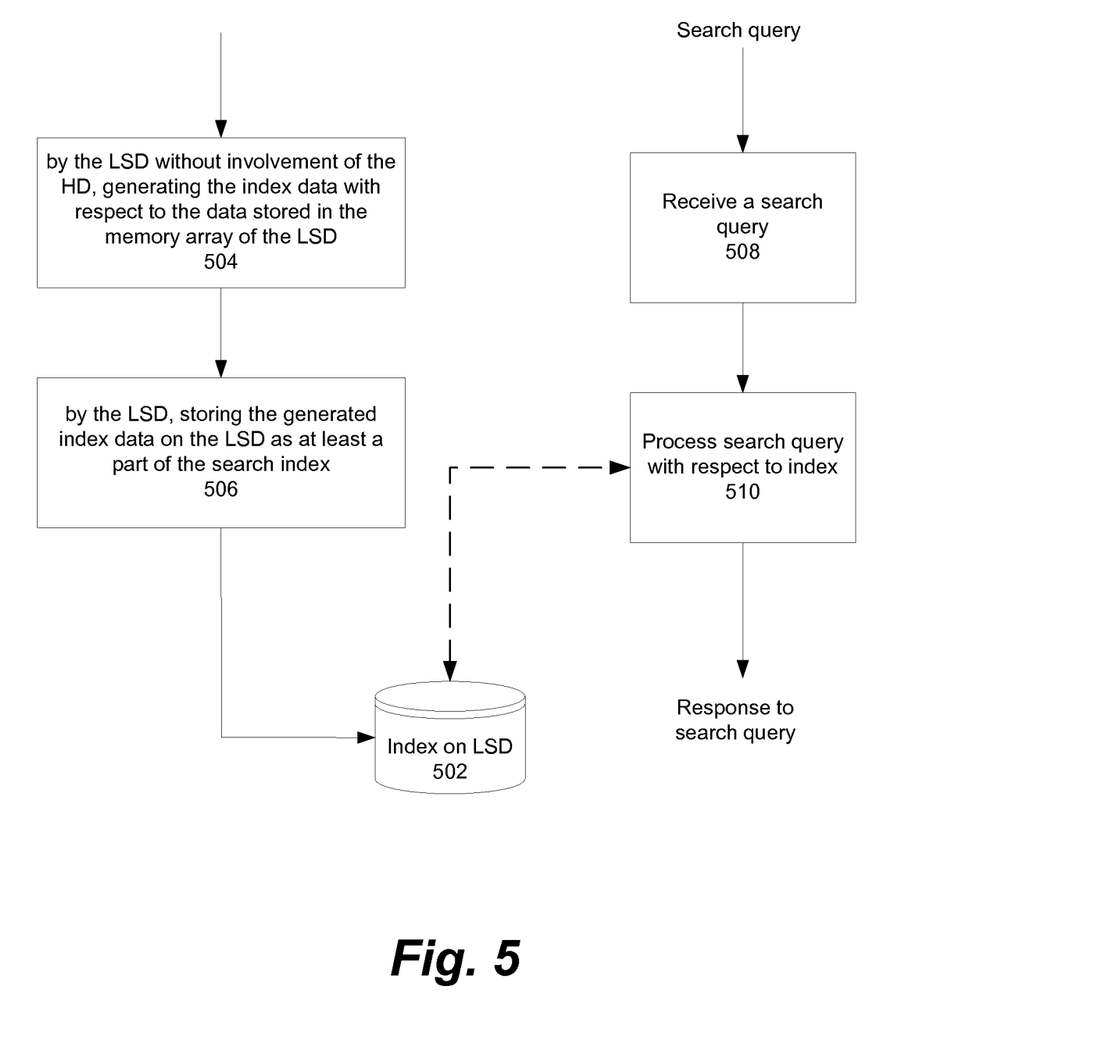
FIG. 5 is a flowchart illustrating, in a broad aspect, a method by which an LSD may determine indexing data indicative of data stored in a memory array of the LSD.

We now turn to FIG. 5, which is a flowchart illustrating, in a broad aspect, a method by which an LSD may generate index data for an index 502 on the LSD. At 504, without involvement of the HD, the LSD generates index data with respect to data stored in a memory array of the LSD. The memory array of the LSD is managed as data blocks by the HD. At 506, the LSD stores the generated index data on the LSD as at least a part of the search index 502. Thus, for example, a search query may be received (508) and the search query processed (510) with respect to the index 502 to generate a response to the search query.

We have thus described a system and method by which an LSD may index data in a memory array of the LSD without involvement of a host device (HD). In addition, we have described how the index may be processed to, for example, respond to search queries. We have also described, for example, how the search index may be employed for content screening.

Advantages of the invention are numerous. Different embodiments or implementations may yield one or more of the following advantages. One advantage of the invention is the data in the LSD can be indexed without consideration of modifying functionality of the HD. Furthermore, the index can be associated with a particular LSD, even if the LSD is used with multiple HD's.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of generating a search index with respect to data stored in a mass storage array of a local storage device, the method comprising:

in a local storage device having a mass storage array arranged in data blocks for access by a host device and a controller operatively coupled to the mass storage array, the controller having an indexer:

generating index data with respect to content of data received from the host device and stored in the mass storage array of the local storage device, the generating being performed independently of the host device by the controller with the indexer, wherein generating the index data comprises:

observing commands received from the host, including commands for read and/or write access to data blocks in the mass storage array;

determining a characteristic of the content of the data based on the observed commands; and generating the index data based at least in part on the determined characteristic; and storing the generated index data on the local storage device as at least a part of the search index, the search index usable to search the data stored in the mass storage array.

2. A method of generating a search index with respect to data stored in a mass storage array of a local storage device, the method comprising:

in a local storage device having a mass storage array arranged in data blocks for access by a host device and a controller operatively coupled to the mass storage array, the controller having an indexer:

generating index data with respect to content of data received from the host device and stored in the mass storage array of the local storage device, the generating being performed independently of the host device by the controller with the indexer, wherein generating the index data comprises:

observing data access operations by the host device relative to the mass storage array of the local storage device wherein such data access operations result in data blocks being provided to the mass storage array from the host device or being provided to the host device from the mass storage array;

determining a characteristic of the content of the data blocks being provided in the observed data access operations; and generating the index data based at least in part on the determined characteristic of the content and;

storing the generated index data on the local storage device as at least a part of the search index, the search index usable to search the data stored in the mass storage array.

3. The method of claim 2, wherein: the data access operations include operations to access data of media content; and determining the characteristic of the content includes determining behavior represented by observed data access operations, relative to the media content, and at least including data other than the data of the accessed media content itself.

4. The method of claim 1, wherein: the host device includes a host device file system and the data access operations by the host device relative to the mass storage array of the local storage device include host device file system operations.

5. The method of claim 1, wherein: generating the index data with respect to the data stored in the mass storage array of the local storage device includes generating the index data to at least include the data stored in the mass storage array.

6. The method of claim 5, wherein: generating the index data to at least include the data stored in the mass storage array includes extracting content that is comprised of data stored in the mass storage array, wherein the content is the data stored in the mass storage array.

7. The method of claim 1, wherein: generating the index data with respect to the data stored in the mass storage array of the local storage device includes performing a recognition algorithm on data stored in the mass storage array, wherein the generated index data is indicative of a result of the recognition algorithm.

8. The method of claim 1, wherein: generating the index data with respect to the data stored in the mass storage array of the local storage device includes, by the local storage device, accessing the data from the mass storage array of the local storage device and generating the index data with respect thereto, without involvement of the host device.

9. The method of claim 1, further comprising the controller of the local storage device: receiving a search query; and processing the search query with respect to the search index and providing a search result in response thereto.

10. The method of claim 9, wherein: receiving a search query includes receiving a search query from the host device.

11. The method of claim 9, wherein: receiving a search query includes receiving a search query from a device other than the host device.

12. The method of claim 1, further comprising: providing the search index from the local storage device to the host device.

13. The method of claim 1, further comprising: providing the search index from the local storage device to a device other than the host device.

14. The method of claim 1, further comprising: receiving a data access request from the host device for particular content in the mass storage array of the local storage device; and by the local storage device, based on the data access request, processing the generated index data in view of the particular content of the data access request to determine whether to block the access request.

15. A local storage device configured for use in a computing system having a host device in communication with the local storage device, the local storage device comprising: a mass storage array arranged in data blocks for access by the host device; and a controller configured to: without involvement of the host device, and independent of the host device, generate index data for a search index with respect to content of data stored in the mass storage array of the local storage device, the generation being performed by an indexer of the controller configured to: observe commands received from the host device as a result of data access operations by the host device relative to the mass storage array of the local storage device wherein such data access operations result in data blocks being provided to the mass storage array from the host device or being provided to the host device from the mass storage array; determine a character of the content of the data blocks based on the observed commands; and generate the index data based at least in part on the determined character of the content of the data blocks; and cause the generated index data to be stored on the local storage device as at least a part of the search index, the search index being arranged to facilitate a search of the data stored in the mass storage array.

16. The local storage device of claim 15, wherein the controller of the local storage device is further configured to: observe data access operations by the host device relative to the mass storage array of the local storage device wherein such data access operations result in data blocks being provided to the mass storage array from the host device or being provided to the host device from the mass storage array; determine a content of the data blocks being provided in the observed data access operations; and generate the index data based at least in part on the determined content.

17. The local storage device of claim 16, wherein the data access operations include operations to access data of media content; and the controller of the local storage device is further configured to determine access behavior represented by observed data access operations, relative to the media content, and at least including data other than the data of the accessed media content itself.

18. The local storage device of claim 15, wherein the data access operations by the host device relative to the mass storage array of the local storage device include host device file system operations.

19. The local storage device of claim 15, wherein the controller is configured to generate the index data to at least include the data stored in the mass storage array.

20. The local storage device of claim 19, wherein the controller is configured to extract content that is comprised of data stored in the mass storage array, wherein the content is the data stored in the mass storage array.

21. The local storage device of claim 15, wherein the controller is configured to execute a recognition algorithm on data stored in the mass storage array, wherein the generated index data is indicative of a result of the recognition algorithm.

22. The local storage device of claim 15, wherein the controller is configured to access the data from the mass storage array of the local storage device and generate the index data with respect thereto, without involvement of the host device.

23. The local storage device of claim 15, wherein the controller of the local storage device is further configured to: receive a search query; and process the search query with respect to the search index and provide a search result in response thereto.

24. The local storage device of claim 23, wherein the search query comprises a search query from the host device.

25. The local storage device of claim 23, wherein the search query comprises a search query from a device other than the host device.

26. The local storage device of claim 15, wherein the controller of the local storage device is further configured to provide the search index from the local storage device to the host device.

27. The local storage device of claim 15, wherein the controller of the local storage device is further configured to provide the search index from the local storage device to a device other than the host device.

28. The local storage device of claim 15, wherein the controller of the local storage device is further configured to: receive a data access request from the host device for particular content in the mass storage array of the local storage device; and process the generated index data in view of the data access request to determine whether to block access to data identified in the data access request.

29. The method of claim 1, further comprising the controller of the local storage device determining which of a plurality of different data types the received data is associated with and storing an indicator of the determined data type in the search index.

30. The local storage device of claim 15, wherein the controller is further configured to configured determine which of a plurality of different data types the received data is associated with and store an indicator of the determined data type in the search index.

* * * * *